United States Patent
Kramper et al.

(10) Patent No.: US 10,605,919 B2
(45) Date of Patent: Mar. 31, 2020

(54) METHOD FOR PROCESSING ECHO PULSES OF AN ACTIVE 3D LASER SENSOR TO PROVIDE DISTANCE MEASUREMENTS

(71) Applicant: Hensoldt Sensors GmbH, Taufkirchen (DE)

(72) Inventors: Patrick Kramper, Immenstaad (DE); Thomas Muensterer, Tettnang (DE)

(73) Assignee: Hensoldt Sensors GmbH, Taufkirchen (DE)

(*) Notice: Subject to any disclaimer, the term of this patent is extended or adjusted under 35 U.S.C. 154(b) by 323 days.

(21) Appl. No.: 15/569,371

(22) PCT Filed: Apr. 27, 2016

(86) PCT No.: PCT/EP2016/000680
§ 371 (c)(1),
(2) Date: Oct. 25, 2017

(87) PCT Pub. No.: WO2016/173711
PCT Pub. Date: Nov. 3, 2016

(65) Prior Publication Data
US 2018/0306921 A1     Oct. 25, 2018

(30) Foreign Application Priority Data
Apr. 29, 2015   (EP) .................... 15001260

(51) Int. Cl.
*G01C 3/08*     (2006.01)
*G01S 17/18*    (2020.01)
(Continued)

(52) U.S. Cl.
CPC .............. *G01S 17/18* (2020.01); *G01S 7/487* (2013.01); *G01S 7/4865* (2013.01); *G01S 17/10* (2013.01); *G01S 17/933* (2013.01); *G01S 17/931* (2020.01)

(58) Field of Classification Search
None
See application file for complete search history.

(56) References Cited

U.S. PATENT DOCUMENTS 4,132,991 A * 1/1979 Wocher ................. G01S 7/2923
                                                    342/134
5,179,286 A * 1/1993 Akasu ..................... G01S 17/10
                                                    250/559.38
(Continued)

FOREIGN PATENT DOCUMENTS

DE      4204414 C1 *  6/1993  ......... G01F 23/2962
EP      2 634 597 A1   9/2013
(Continued)

OTHER PUBLICATIONS

Robert Hecht, Gotthard Meinel, and Manfred F. Buchroithner "Estimation of Urban Green Volume Based on Single-Pulsa LiDAR Data" (Year: 2008).*
(Continued)

*Primary Examiner* — Isam A Alsomiri
*Assistant Examiner* — Amir J Askarian
(74) *Attorney, Agent, or Firm* — Crowell & Moring LLP

(57) ABSTRACT

A method for processing echo pulses of an active 3D sensor to provide distance measurements of surroundings in front of the active 3D sensor includes defining a near range distance from the active 3D sensor and defining a last echo distance from the active 3D sensor greater than said defined near range distance. The method includes receiving a sequence of echo pulses of a signal emitted by the active 3D sensor and subjecting the sequence of echo pulses to a pre-defined trigger condition such that only those echo pulses are taken into consideration which fulfill the pre-defined trigger condition. The method also includes determining, from the echo pulses which fulfill the predefined trigger condition and that are received from distances greater (Continued)

than a defined near range distance, a first echo pulse and an adaptive echo pulse, and providing distance measurements of the surroundings in front of the 3D sensor using the determined first echo pulse and the determined adaptive echo pulse.

7 Claims, 7 Drawing Sheets

(51) Int. Cl.
    *G01S 7/487*     (2006.01)
    *G01S 17/10*     (2020.01)
    *G01S 7/4865*     (2020.01)
    *G01S 17/933*     (2020.01)
    *G01S 17/931*     (2020.01)

(56) References Cited

U.S. PATENT DOCUMENTS

| | | | | |
|---|---|---|---|---|
| 8,736,818 B2 * | 5/2014 | Weimer | ............... | G01C 3/08 |
| | | | | 250/208.2 |
| 2011/0043515 A1 * | 2/2011 | Stathis | ............... | G01C 15/002 |
| | | | | 345/419 |

FOREIGN PATENT DOCUMENTS

| | | | |
|---|---|---|---|
| GB | 2 308 763 A | 7/1997 | |
| WO | WO-9624027 A2 * | 8/1996 | ......... G01F 23/2962 |

OTHER PUBLICATIONS

Claudia Paris, Student Member, IEEE, and Lorenzo Bruzzone, Fellow, IEEE "A Three-Dimensional Model-Based Approach to the Estimation of the Tree Top Height by Fusing Low-Density LiDAR Data and Very High Resolution Optical Images" (Year: 2015).*
PCT/EP2016/000680, International Search Report dated Jul. 5, 2016 (Two (2) pages).
Murray et al., "Dust-Penetrating (DUSPEN) 'see-through' lidar for helicopter situational awareness in DVE", Proc. of SPIE, vol. 8737 87370H-1, 8 total pages, 2013.
Ullrich et al., "Waveform digitizer laser scanners for surveying and surveillance applications", Proc. of SPIE, vol. 5988 87370P-1, 8 total pages, 2005.
Ullrich et al., "High resolution laser scanner with waveform digitization for subsequent full waveform analysis", Proc. of SPIE, vol. 5791, p. 82-88, 2005.
Trickey et al., "Characterization of the OPAL Obscurant Penetrating LiDAR in various Degraded Visual Environments", Proc. of SPIE, vol. 8737 87370E-2, 9 total pages, 2013.
Seidel et al., "Helicopter collision avoidance and brown-out recovery with HELLAS", Proc. of SPIE, vol. 7114 71140G-1, 8 total pages, 2008.
Stelmash et al., "Flight test results of ladar brownout look-through capability", Proc. of SPIE, vol. 9417, 14 total pages, 2015.

* cited by examiner

METHOD FOR PROCESSING ECHO PULSES OF AN ACTIVE 3D LASER SENSOR TO PROVIDE DISTANCE MEASUREMENTS

FIELD OF THE INVENTION

The invention relates to methods of processing echo pulses of an active 3D laser sensor to provide distance measurements.

BACKGROUND AND SUMMARY OF THE INVENTION 3D sensors, in particular lidar, radar and similar systems increasingly become the main source of data used for both manned and unmanned vehicles operating in demanding environments. They are providing data e.g. for obstacle warning systems and for landing aid systems. For operational systems the environment is not a clinically well-defined laboratory but data processing has to cope with all aspects of a natural or man-made environment in real-time. When using 3D sensors for the active support of aerial vehicles or autonomous ground vehicles processing the measured 3D data becomes a central task. The amount of data generated by 3D sensors can be tremendous. Therefore, a fast, intelligent and efficient way of data reduction has to be found. This invention is concerned with data selection and reduction at the very first steps in the evaluation of the sensor data (conducted in an analogue pulse analyzer as a subsystem of the 3D sensor).

Particularly for optical sensors used for obstacle warning and as landing aid in degraded vision environment (DVE), requirements for detection are diverse, sometimes competitive, or even contradictory. Primarily the sensor can work as an obstacle warning system where it is very sensitive to small signals provided by the echo of thin wires in the range from tens of meter to more than 1000 m. For doing this, radiation shall pass through air that might be obscured by fog, clouds, dust etc. The echoes originating from these obscurants must not damage the sensor and ideally should be ignored by the 3D sensor. In addition, the sensor can detect ground in the same distance range mentioned before. As the back reflected intensity decreases with $1/r^2$ or $1/r^3$ for bulk targets and for wire targets, respectively, the signal receiver has to cope with signal intensities that cover several orders of magnitude.

There are currently two approaches in common 3D measurement systems based on photon runtime measurement, i.e. time of flight counters. The first known art is to record the complete returned intensity sequence, digitize and analyze it digitally in real time. This evaluation requires enormous computing power due to the huge amount of data points on the one hand and the enormous signal dynamics on the other hand ([MUR13, ULL05a, ULL05b]).

Another known approach is to extract discrete points of time by applying a trigger condition on the signal train. The invention as described in the following will apply this particular approach.

A schematic representation of a system used for carrying out such a method is depicted in FIG. 1. An emitter 11 sends pulses of radiation 15 (e.g. laser or radar pulses). Part of the intensity is scattered back or reflected back by an object 16 (e.g. ground, wires, obscurants) and is received by a receiver 12. The signal intensity train or signal amplitude train (short signal train) is investigated in a pulse analyzer 13 producing one or a series of measurement distances which are prepared for further processing 14.

FIG. 2 shows an example of a signal train 21 as received by a receiver 12. The signal train includes several signal peaks evoked by scattering of the emitted pulse by objects in different distances. The intensity of the returning echo pulses is compared to a trigger threshold 41 (hereinafter also called trigger level). A peak exceeding the trigger threshold 41 is called an echo pulse (or echo for short). The time of such event (hereinafter called trigger time) is stored and such event is called a trigger event 23. Trigger time of an echo and the distance of the object that gave rise to this particular echo are connected via the velocity of the electromagnetic radiation emitted by the 3D sensor which can be taken as constant. Hence, trigger time and object distance are equivalent and can both be used for the horizontal axis of the diagram of FIG. 2 (this applies also to the diagrams of FIG. 3 to 6). As shown in FIG. 2 the trigger level 41 may be time-dependent, i.e. decreasing with time, to compensate for signal decrease with distance. As a result, undesired events, in particular caused by fog and snow are suppressed. Those signals are often much smaller than signals of hard targets.

In the example of FIG. 2, a so-called rising edge trigger is used, i.e. the trigger time is defined by the time the signal strength reaches the trigger level on the rising edge of the echo pulse. There are numerous other well-known trigger methods in order to determine an echo pulse and to derive a trigger time there from. Simple methods are comparators and Schmitt triggers where the signal train is compared to trigger thresholds and the time of the rising or the falling edge of the threshold crossing is recorded. More sophisticated methods are pulse width triggers and constant fraction discriminators [GED68]. A trigger condition typically contains one or more trigger parameters, like threshold, rise time, etc. The variety of conditions can be extended by combining or cascading trigger methods and parameters. In this manner trigger conditions can be tailored for expected patterns of the signal train.

Additional measures are known in order to dismiss undesired echoes and thus limiting the number of echoes to be processed. They may stem from dust, fog, etc. in the vicinity of the sensor. A frequently used technique to avoid such undesired trigger events is to use the so-called range gating. Echoes arriving from distances smaller than a minimum distance (hereinafter: the near range distance) are suppressed thus creating a blind zone in the direct vicinity of the 3D sensor.

The echoes of the signal train 21 which are received from outside said blind zone and that are fulfilling the trigger condition (e.g. that are above the trigger threshold) are intuitively labeled $1^{st}$ echo pulse, $2^{nd}$ echo pulse, $3^{rd}$ echo pulse, last echo pulse, etc. according to their rank in the chronological order in which the echo pulses are received. It has been reported that up to 16 of these echo pulses are being processed [TRI13]. Here, too, computing power limits the number of echo pulses to be processed. Interface bandwidth and the need for real-time processing are highly limiting factors, especially in airborne applications. When the correlation between different echoes is investigated the required processing power increases tremendously with the number of returns processed. As a consequence, frequently two echoes are used [SEI08]. They are typically an acceptable compromise between the need of information of more than one pulse and the available computing performance. The present invention applies this two-echo approach.

A known two-echo approach [STE15] that exploits first and second echo uses a so-called delta range gate: One defines a so-called blind zone immediately behind (as seen from the 3D sensor) the object that caused the first echo. Any trigger event caused by an echo from objects within the blind zone (in the time domain this corresponds to a certain time slot after arrival of the first echo), will be ignored. Hence, the second trigger event can only be caused by an echo arriving from distances behind the blind zone.

The less echoes that are processed, the more crucial it is to choose those echoes for further processing that contain the most useful information. For two echoes the selection of the echoes is a central task. The selected echoes shall produce measurement distances of real objects instead of artifacts. In the context of obstacle warning under normal weather conditions, processing of the $1^{st}$ echo is inevitable. In most cases it contains the echo of the actual obstacles. Thus, for 2-echo systems the remaining task of selection of echoes is limited to the selection of the remaining secondary echo. Commonly, a $1^{st}/2^{nd}$ echo scheme or a $1^{st}$/last echo scheme is used. The second echo seems to be the best choice for obstacle detection in most DVE situations. Here, the first echo might be an echo from an obscurant e.g. dust, rain, fog or snow and the second echo might stem from an actual obstacle. Ground detection is another key function. It is the main task during lift off, approach and landing and, in addition, it is a significant side functionality in obstacle warning. For ground detection the last echo is to be preferred as ground will always cause the very last echo.

Hence, in conventional 2-echo systems important information is missing. Even global switching between $1^{st}$/last and $1^{st}/2^{nd}$ echo will not overcome the problem as all three echoes are useful in one and the same particular flight situation. For use of a sensor as obstacle warning system and landing aid in DVE situations, it would be very helpful to have a last echo in the short range and a second echo in the long range independently for each single shot measurement, i.e., each pixel. This requirement seems to be contradictory.

Hence, it is the object of the invention to provide a method for processing echo pulses by which this requirement can be fulfilled.

The present invention provides a method for processing echo pulses by an active 3D sensor in order to provide distance measurements of the surroundings in front of the 3D sensor, comprising the following steps:

defining a near range distance from the 3D sensor,
defining a last echo distance from the 3D sensor greater than the predefined near range distance,
receiving echo pulses of the signal emitted by the active 3D sensor and subjecting that sequence of echo pulses to a pre-defined trigger condition so that only those echo pulses are taken into consideration which fulfill the predefined trigger condition, and determining the respective trigger times and corresponding distances,
suppressing echo pulses from distances smaller than the predefined near range distance,
out of the echo pulses that fulfill the predefined trigger condition and are received from distances greater than the predefined near range distance, determining two particular echo pulses, designated first and adaptive echo pulse, according to the following procedure:
determining the echo pulse that was received first (in the following called "first echo pulse"),
determining another echo pulse (in the following called "adaptive echo pulse") as follows:
if one or more echo pulses received from distances greater than the predefined last echo distance occur, the one of these pulses which was received first will be selected as the adaptive echo pulse,
if there are no echo pulses received from distances greater than the predefined last echo distance, then the last echo pulse received will be selected as the first echo pulse,
using the two so identified echo pulses (first echo pulse and adaptive echo pulse) for providing distance measurements in the surroundings in front of the 3D sensor.

By using the method according to the invention, the two echoes of the signal train that are of highest relevance are selected.

The central drawback of known two echo systems is overcome: The adaptive echo pulse has the features of a last echo in the short range and the features of second echo in the long range. It shares the advantages of the $1^{st}/2^{nd}$ and $1^{st}$/last echo scheme but not their disadvantages.

The method according to the invention is applicable for all types of 3D measuring devices with time of flight measurements and subsequent pulse analysis resulting in two discrete values for echo distances.

The method according to the invention satisfies the requirements for a wide range of 3D sensor applications and operational situations, especially for optical 3D scanners. It can be completely implemented in the analogue pulse analyzer of the 3D sensor. The described logical operations performed on the signal train are easy to implement in hardware or firmware.

It is a further advantage of the method according to the invention that the filtering process according to the invention is performed at an early stage of the complete processing chain where it is most effective. The invention reduces the information of each single 3D measurement to discrete distance values that contain the desired information and that are affected by artifacts as little as possible.

Preferably, the trigger condition can be constructed in a time-dependent fashion in order to take into account that the received signal intensity and shape is highly dependent from distance and from the origin of the signal.

Preferably, the identification of first and adaptive echo pulse is conducted by applying different trigger conditions in separate process channels. That means reception and recording of trigger times of the echo pulses is done in parallel in separate pulse analyzers using different trigger conditions (e.g. different trigger thresholds). The different trigger conditions can be adapted to the typical reception conditions of first echo and adaptive echo. For instance, when the trigger condition is based on a trigger threshold, the threshold for determining the first echo will generally be higher than the threshold for the determination of the adaptive echo. In a preferred embodiment, the trigger condition in both channels can be time dependent. Another advantageous option is to apply a time dependent trigger condition only for the determination of the first echo and a constant trigger condition for the determination of the adaptive echo.

It is an important advantage that the described evaluation of first and adaptive echo by using different trigger conditions allows independent optimization with respect to the actual purpose of the two echoes. One important special case is ground detection under brownout conditions. Here, the intensity reflected from the cloud of dust may be strong and the transmitted intensity may be highly attenuated even in short distances. Therefore, a stringent trigger condition (e.g. a relatively high trigger level) is only advantageous with respect to the suppression of undesired trigger events for a first echo and a second echo but not for a last echo.

Furthermore, the use of two independent trigger conditions allows qualitative conclusions about echo signal strength and shape. For instance, the fact that an echo has fulfilled both trigger conditions may provide useful additional information. In cases where there is only an adaptive echo but no first echo or in cases where the trigger time of the adaptive echo is earlier compared to the trigger time of the first echo, the information is already inherently included in the distance information. In the important case when the trigger level for the adaptive echo is lower than that for the first echo the adaptive echo must be a weak echo.

The 3D sensor data in the form of first and adaptive echo can be further processed according to well-known techniques. In particular the 3D data can be fused with navigational data in order to provide geo-referenced 3D data of the surroundings. Filtering operations can be conducted to remove the adverse impact of sun, cloud, dust, drop-in etc. on the 3D data. Further, a classification of objects can be performed and warnings and visualization outputs can be generated and brought to the attention of the human operator of the vehicle.

BRIEF DESCRIPTION OF THE FIGURES

The present invention is described in more detail below with references to several figures.

DETAILED DESCRIPTION OF EXEMPLARY EMBODIMENTS

Figure 1:
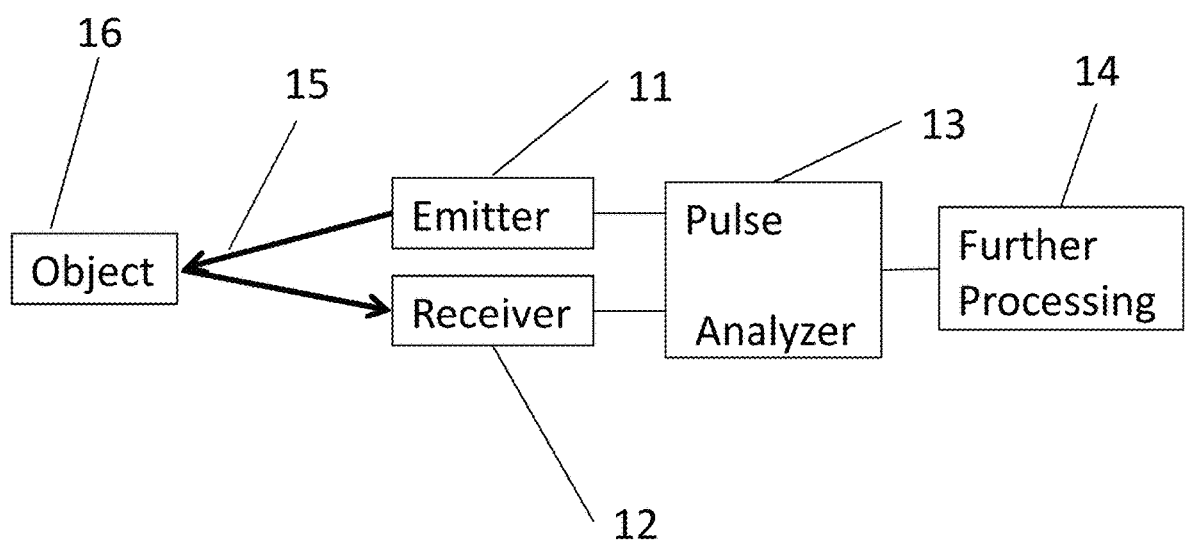
FIG. 1 shows a block diagram of a known subsystem of a 3D sensor as already described above. Such system can also be used for carrying out the method according to the invention.
Figure 2:
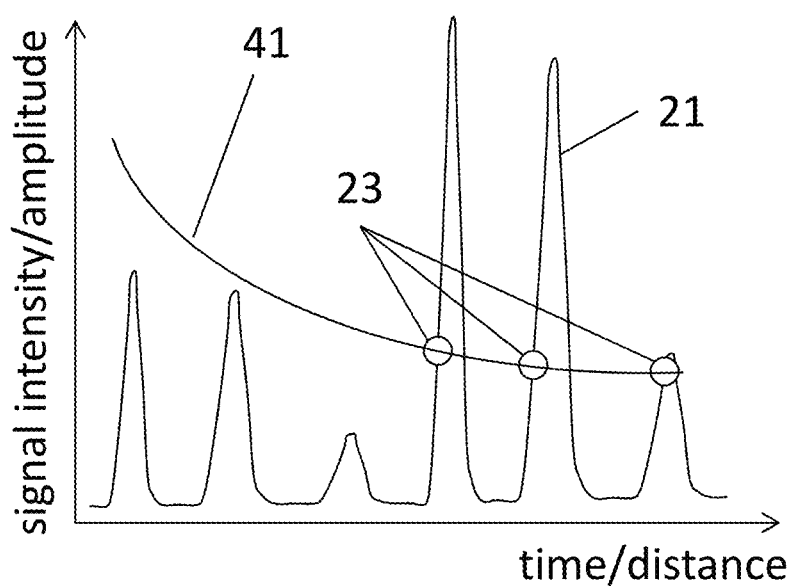
FIG. 2 illustrates the signal intensity/amplitude of the received signal train compared to a time-dependent trigger condition (here: based on a pre-defined trigger thresold) as described above.
Figure 3:
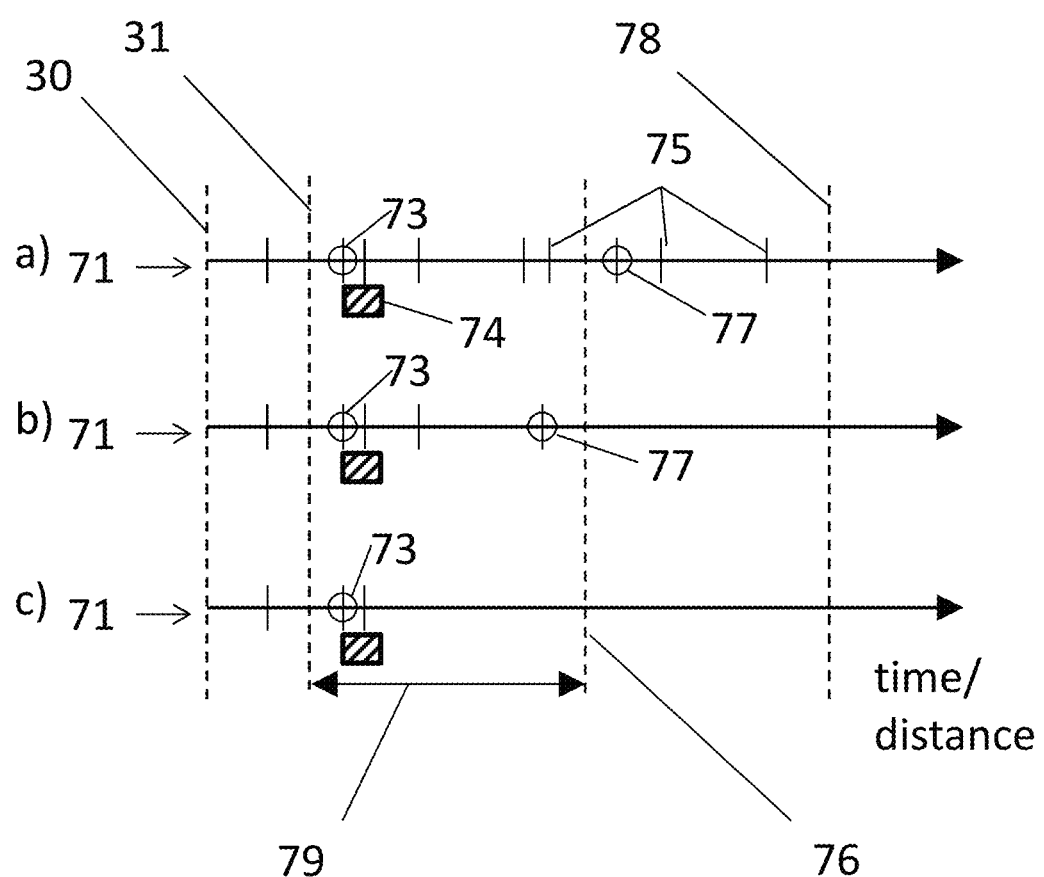
FIG. 3 illustrates the determination of first and adaptive echo according to the invention.

FIG. 3 illustrates three concrete examples a), b), c) of how first and adaptive echo according to the invention are determined. In each example, a series 71 of trigger times/ echo distances 75 (each indicated by a vertical stroke along the time line) are recorded. The trigger times ultimately selected as belonging to first 73 and adaptive 77 echoes are additionally marked with a small circle.

The dotted vertical line 30 on the left marks the time t=0, that corresponds to the distance d=0 of an object from the 3D sensor. Numeral 31 designates the near range distance. Trigger events that correspond to a distance smaller than the near range distance 31 are generally ignored. The length of the near range distance typically amounts to at least 20 m, and may increase with increasing speed of the sensor carrier (e.g. a helicopter). Further, a last echo zone 79 is defined which is an area in front of the 3D sensor that begins at the near range distance 31 and ends in a predefined distance herein forth called the last echo distance 76 (the latter being preferably in the range between 100 m and 250 m). All trigger events beyond the end of range distance 78 are ignored.

A blind zone 74 immediately behind the object that caused the first echo can be defined (first echo blind zone). Echoes of this zone are ignored, in particular for the purpose of avoiding double triggering (i.e. identical or similar trigger times but relating to the same physical object, like two branches of the same tree, or electronic artefacts, etc.). It has to be noted that the introduction of the blind zone provides specific advantages with respect to the avoiding of double triggering as just explained. However, the blind zone behind the first object is not mandatory. Acceptable results of the method according to the invention can be achieved already without the application of the blind zone.

In determining the adaptive echo 77 different cases have to be considered: If there is at least one trigger event beyond the last echo distance 76 then the first echo beyond the last echo distance is selected as the adaptive echo 77. Otherwise, the last echo of the signal train 71 is used. If beside the first echo 73 there is no trigger event left for the adaptive echo then no value for the adaptive echo will be generated.

In example a) echoes beyond last echo distance 76 exist. Hence, the first echo beyond the last echo distance is the adaptive echo 77.

In example b) no echo beyond last echo distance 76 occurred. Consequently, the last echo inside the last echo zone 79 forms the adaptive echo 77.

In example c) no adaptive echo is generated because the sole trigger event beyond the near range distance 30 lies in the blind zone 74 immediately after first echo.

Figure 4:
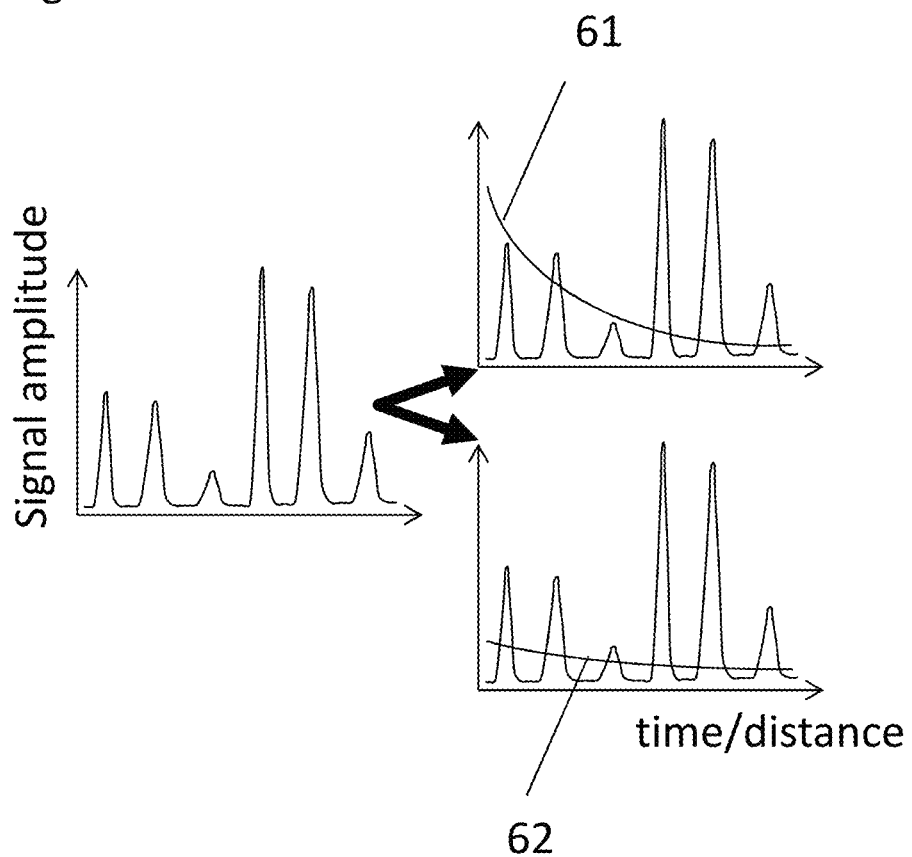
FIG. 4 illustrates the signal intensity/amplitude of the received signal train compared to different time-dependent trigger conditions (here: based on pre-defined trigger thresholds) applied for the determination of first and adaptive echo.

In an advantageous embodiment of the method according to the invention different trigger conditions are used for the determination of the first echo on the one hand and the adaptive echo on the other hand. FIG. 4 shows two exemplary trigger levels for use in connection with the present invention. The higher trigger level 61 is used for the determination of the first echo and the lower trigger level 62 is used for the determination of the adaptive echo.

As previously pointed out, the intensity scattered by the objects is highly dependent on their distance to the sensor. Therefore, preferably time dependent trigger conditions as shown in FIG. 4 are applied. The selection of time-dependent trigger conditions is of particular importance for the determination of the first echo because "wasting" the first echo to an artifact is avoided. Therefore, especially for small distances, the trigger level 61 is substantially higher than the trigger level 62. With respect to the determination of the adaptive echo (i.e. secondary echoes arriving from more distant objects) the decreasing trigger level in time ensures that sensitivity of the 3D sensor is still sufficient, This is of particular importance in situations where the signal is highly attenuated e.g. in the presence of dust.

Three examples of the determination of the first echo and the adaptive echo by using different trigger levels is shown in FIG. 5a),b),c) respectively. In each example two independent series 71,72 of trigger times/echo distances 75 were recorded. The first series 71 was generated by using the higher trigger level 61 (FIG. 4) and the second series 72 was generated by using the lower trigger level 62.

The dotted vertical lines have the same meaning as explained with respect to FIG. 3. Typical values for the near range distance 31 and the last echo distances 76 are the same as mentioned in connection with FIG. 3 where only one trigger level was used.

The first echo 73 is determined in the first process channel 71 containing the shown series of echoes in the signal train.

The first echo 73 is the one echo of series 71 that occurs first after the point in time that corresponds to the near range distance 31.

The selection of the adaptive echo 77 is based on the series of echoes included in the echo series 72. Again, echoes belonging to objects at a distance smaller than the near range distance 31 are generally ignored.

Similarly to the method described in FIG. 3, a blind zone 74 around the object that caused the first echo 73 can be defined (first echo blind zone). It is extended to a time before the trigger time of the first echo in order to consider also the case when the trigger time for one and the same event is slightly earlier in the echo series 72 than in the echo series 71 due to the different trigger conditions. Echoes from objects located in this zone are ignored, in particular for the purpose of avoiding double triggering as further explained above.

The adaptive echo 77 is determined among the series of echoes 72. If there is at least one trigger event beyond the last echo distance 76 then the first echo beyond the last echo distance 76 is selected as the adaptive echo 77. Otherwise, the last echo of the series of echoes 72 is used which in this case lies in the last echo zone 79. If there is no trigger event left for the adaptive echo no value for the adaptive echo will be generated.

In example a) series 72 contains a multitude of echoes beyond last echo distance 76. Hence, the first echo beyond the last echo distance 76 is the adaptive echo 77.

In example b) series 72 does not contain any echo beyond last echo distance 76. Consequently, the last echo inside the last echo zone 79 forms the adaptive echo 77.

In example c) no adaptive echo is generated because in series 72 the sole trigger event beyond the near range distance lies in the blind zone 74 of first echo (determined in series 71).

Figure 5:
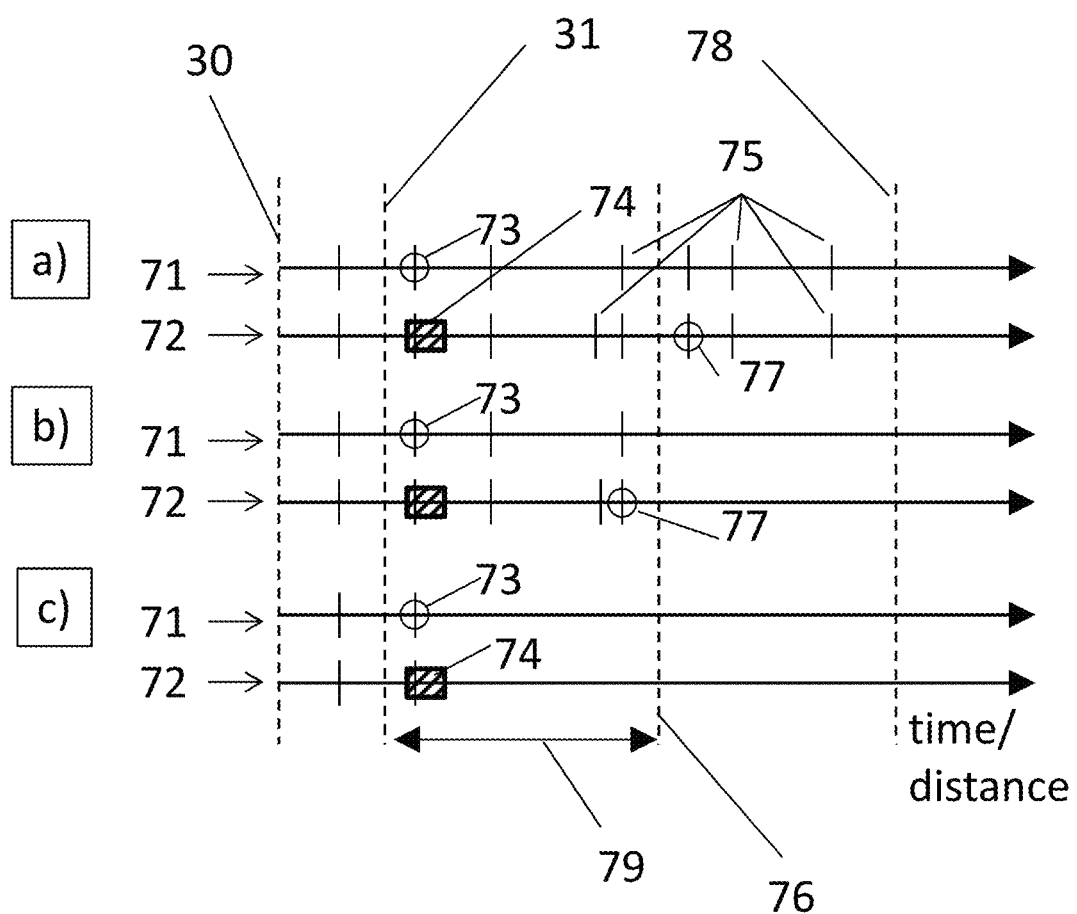
FIG. 5 illustrates the determination of first and adaptive echo by using different trigger thresholds like the one shown in FIG. 4.
Figure 6A:
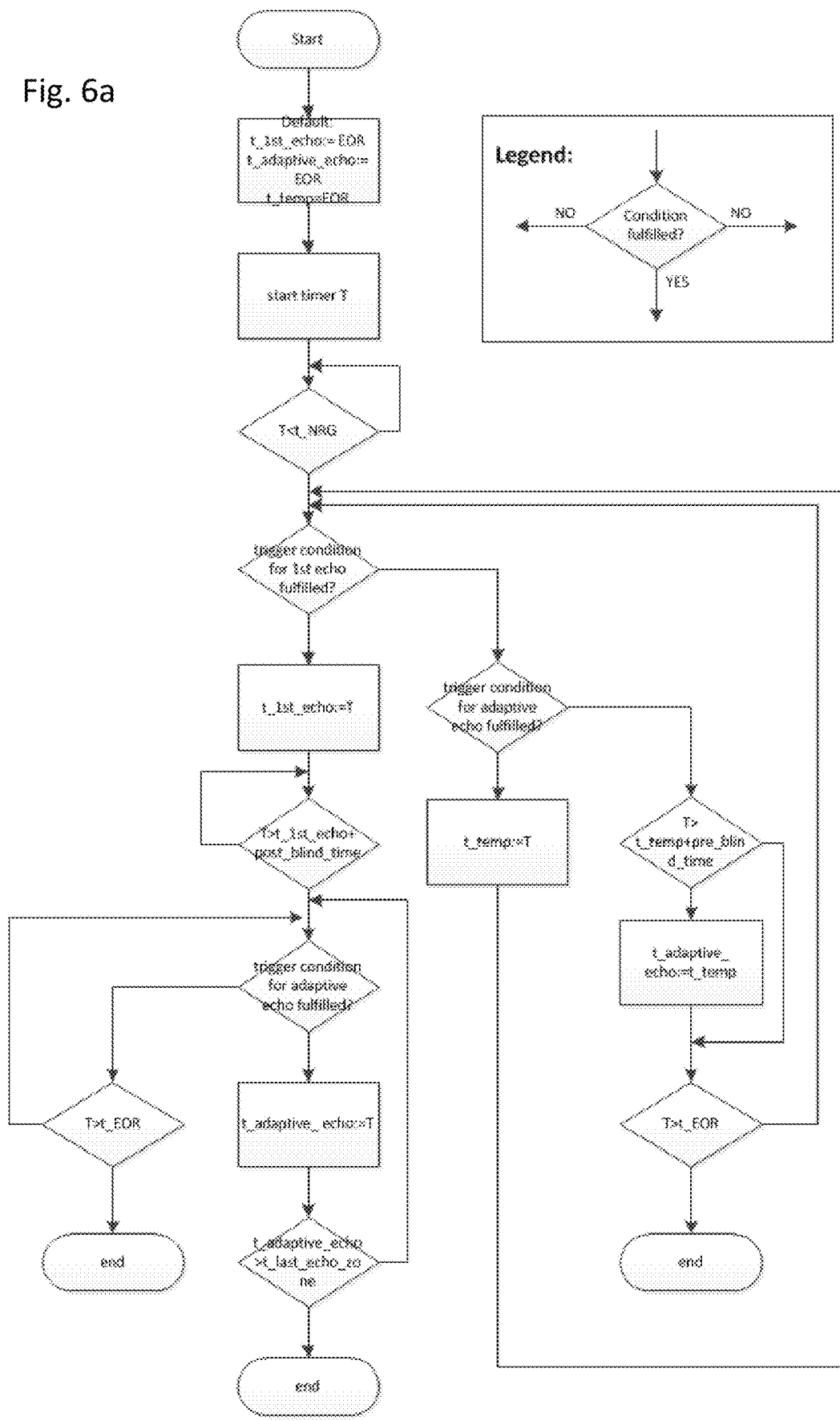
FIG. 6a/b shows flow charts implementing an example method of the invention in realtime;
   a) Example method applying two separate trigger conditions,
   b) Example method applying only one trigger condition.
Figure 6B:
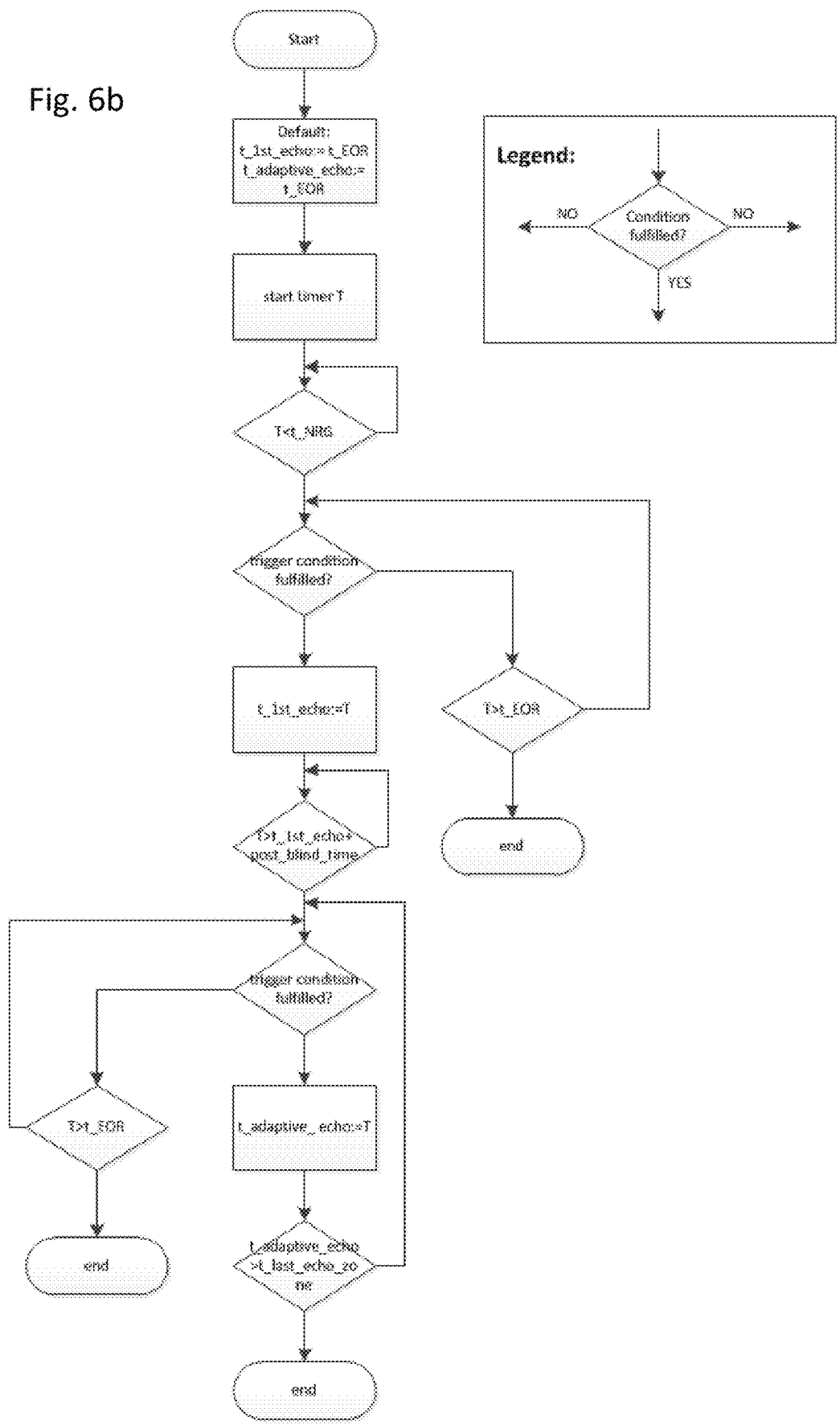

FIG. 6a shows a flow chart that implements the example method shown in FIG. 5 (using two different trigger conditions) in real time in the form of an algorithm. FIG. 6b shows a flow chart of another example method that uses only one trigger condition.

As a general remark it should be noted that the parameters below represent time measurements. As already mentioned any given time measurement can be transferred into the corresponding distance measurement and vice versa via the formula d=c*t/2, where c is the speed of light, d is a distance measurement and t is a time measurement.

t_1st_echo: Trigger time for $1^{st}$ echo
t_adaptive_echo: Trigger time for adaptive echo
T: Timer
t_NRG: time corresponding to near range distance
t_EOR: time corresponding to the end of range, i.e. the maximum measurement time
pre_blind_time: time duration before $1^{st}$ trigger of the first echo blind zone
post_blind_time: time duration after $1^{st}$ trigger of the first echo blind zone
t_last_echo_zone: time corresponding to the last echo distance
t_temp: internal timing buffer

CITATIONS

[MUR13] J. T. Murray et. al, "Dust-Penetrating (DUSPEN) "see-through" lidar for helicopter situational awareness in DVE", Proc. of SPIE Vol. 8737 87370H-1 (2013).

[ULL05a] A. Ullrich and R. Reichert, "Waveform digitizing laser scanners for surveying and surveillance applications", Proc. of SPIE Vol. 5988 59880P-1 (2005).

[ULL05b] A. Ullrich and R. Reichert, "High resolution laser scanner with waveform digitization for subsequent full waveform analysis", Proc. of SPIE Vol. 5791 (2005).

[TRI13] E. Trickey, P. Church and X. Cao, "Characterization of the OPAL Obscurant Penetrating LiDAR in various Degraded Visual Environments", Proc. of SPIE Vol. 8737 87370E-2 (2013).

[SEI08] Seidel, C., Schwartz I., Kielhorn P., "Helicopter collision avoidance and brown-out recovery with HEL-LAS", Proc of SPIE Vol. 7114, 71140G-1, (2008).

[STE15] Stephen Stelmash, Thomas Münsterer, Patrick Kramper, Christian Samuelis, Daniel Büler, Matthias Wegner, Sagar Sheth, "Flight test results of ladar brown-out look-through capability", Proc. Of SPIE Vol. 9417, (2015).

The invention claimed is:

1. A method for processing echo pulses of an active 3D sensor to provide distance measurements of surroundings in front of the active 3D sensor, the method comprising:
    defining a near range distance from the active 3D sensor;
    defining a last echo distance from the active 3D sensor greater than the defined near range distance;
    receiving a sequence of echo pulses of a signal emitted by the active 3D sensor and subjecting the sequence of echo pulses to a predefined trigger condition such that only echo pulses of the sequence of echo pulses are taken into consideration which fulfill the predefined trigger condition;
    determining respective trigger times and corresponding distances for the echo pulses which fulfill the predefined trigger condition;
    suppressing echo pulses, from the sequence of echo pulses, from corresponding distances smaller than the defined near range distance;
    determining, from the echo pulses which fulfill the predefined trigger condition and that are received from corresponding distances greater than the defined near range distance, a first echo pulse and an adaptive echo pulse,
        wherein an echo pulse that was received first is determined as the first echo pulse,
        wherein, if one or more of the echo pulses is received from corresponding distances greater than the defined last echo distance, the one of these echo pulses received first is determined as the adaptive echo pulse,
        wherein, if no echo pulses are received from corresponding distances greater than the defined last echo distance, the last echo pulse received is determined as the adaptive echo pulse; and
    providing distance measurements of the surroundings in front of the 3D sensor using the determined first echo pulse and the determined adaptive echo pulse.

2. The method according to claim 1, wherein the trigger condition is time-dependent.

3. The method according to claim 1, wherein determining the first echo pulse and the adaptive echo pulse comprises applying different trigger conditions to the sequence of echo pulses.

4. The method according to claim 2, wherein determining the first echo pulse and the adaptive echo pulse comprises applying different trigger conditions to the sequence of echo pulses.

5. The method according to 1, wherein, during a predefined time slot around the time of arrival of the first echo pulse, any further echo pulse is suppressed.

6. The method according to 2, wherein, during a predefined time slot around the time of arrival of the first echo pulse, any further echo pulse is suppressed.

7. The method according to 3, wherein, during a predefined time slot around the time of arrival of the first echo pulse, any further echo pulse is suppressed.

* * * * *